United States Patent
Sugimoto (10) Patent No.: US 9,483,125 B2
(45) Date of Patent: Nov. 1, 2016

(54) POSITION INFORMATION OBTAINING DEVICE AND METHOD, AND IMAGE DISPLAY SYSTEM

(71) Applicant: Hideki Sugimoto, Kanagawa (JP)

(72) Inventor: Hideki Sugimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 193 days.

(21) Appl. No.: 14/089,941

(22) Filed: Nov. 26, 2013

(65) Prior Publication Data

US 2014/0198041 A1   Jul. 17, 2014

(30) Foreign Application Priority Data

Jan. 16, 2013 (JP) ................. 2013-005349

(51) Int. Cl.
| | |
|---|---|
| G06F 3/03 | (2006.01) |
| G06F 3/0354 | (2013.01) |
| G06F 3/038 | (2013.01) |
| G06F 3/0484 | (2013.01) |

(52) U.S. Cl.
CPC ........... *G06F 3/0304* (2013.01); *G06F 3/0386* (2013.01); *G06F 3/03542* (2013.01); *G06F 3/03545* (2013.01); *G06F 3/04842* (2013.01)

(58) Field of Classification Search
CPC ............. G06F 3/0304; G06F 3/04842; G06F 3/03542; G06F 3/0386; G06F 3/03545
USPC ................... 345/156, 158, 175, 179, 180
See application file for complete search history.

(56) References Cited

U.S. PATENT DOCUMENTS

| | | | |
|---|---|---|---|
| 2002/0186351 A1* | 12/2002 | Gnanamgari et al. | 353/42 |
| 2010/0013771 A1* | 1/2010 | Cheng | 345/166 |
| 2012/0280909 A1* | 11/2012 | Sugimoto | 345/158 |

FOREIGN PATENT DOCUMENTS

| | | |
|---|---|---|
| JP | 9-154089 | 6/1997 |
| JP | 2004-227230 | 8/2004 |
| JP | 2006-277085 | 10/2006 |
| JP | 2012-234382 | 11/2012 |

\* cited by examiner

*Primary Examiner* — William Boddie
*Assistant Examiner* — Saifeldin Elnafia
(74) *Attorney, Agent, or Firm* — Cooper & Dunham LLP (57) ABSTRACT

A position information obtaining device and a position information obtaining method are provided. Each of the position information obtaining device and the position information obtaining method captures images to which a light pointer is directed and on which a light spot is formed, in chronological order, and estimates position information of a specified position on the images specified by the light pointer using a plurality of pieces of image information obtained from the captured image.

16 Claims, 7 Drawing Sheets

POSITION INFORMATION OBTAINING DEVICE AND METHOD, AND IMAGE DISPLAY SYSTEM

CROSS-REFERENCE TO RELATED APPLICATIONS

This patent application is based on and claims priority pursuant to 35 U.S.C. §119 to Japanese Patent Application No. 2013-005349, filed on Jan. 16, 2013, in the Japan Patent Office, the entire disclosure of which is hereby incorporated by reference herein.

BACKGROUND

1. Technical Field

Example embodiments generally relate to a position information obtaining device, a position information obtaining method, and an image display system, and more particularly, to a position information obtaining device and method capable of obtaining the position information of a position specified by using a light pointer on an image being displayed on an image display surface, and an image display system that includes the position information obtaining device.

2. Background Art

Conventionally, a light pointer is directed to an image displayed on an image display surface, and the position information of a light spot formed on the image is detected by using the light pointer. Further, the detected position information is obtained as the position information of a desired position specified by using the light pointer.

SUMMARY

Embodiments provide a position information obtaining device and a position information obtaining method. Each of the position information obtaining device and the position information obtaining method captures images to which a light pointer is directed and on which a light spot is formed, in chronological order, and estimates position information of a specified position on the images specified by the light pointer using a plurality of pieces of image information obtained from the captured images. Embodiments also provide an image display system that includes the position information obtaining device, image displaying means for displaying an image on the image display surface, and a processing device configured to perform a process that corresponds to the position information, according to the position information of the specified position obtained by the position information obtaining device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An example embodiment of the present invention will be described with reference to FIGS. 1 to 5.

Figure 1:
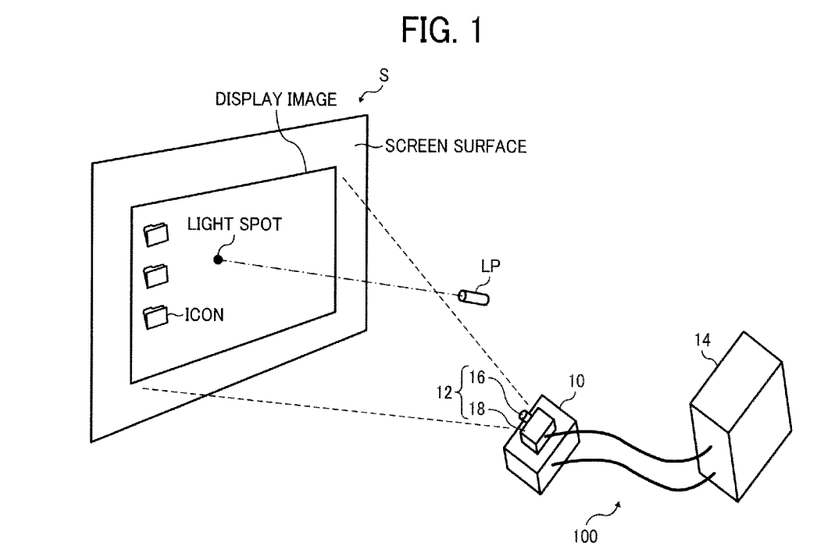
FIG. 1 schematically illustrates the configuration of an image display system according to an example embodiment of the present invention.
Figure 2:
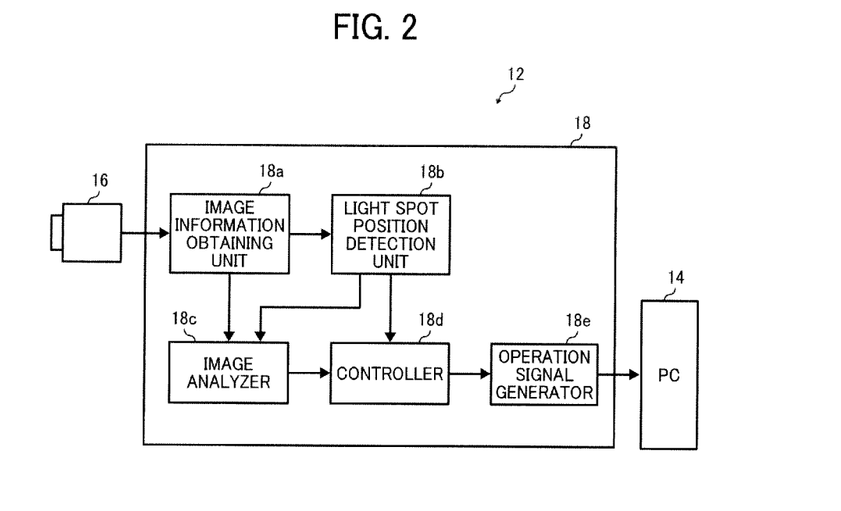
FIG. 2 illustrates a position information obtaining device provided for an image display system, according to an example embodiment of the present invention.
Figure 3:
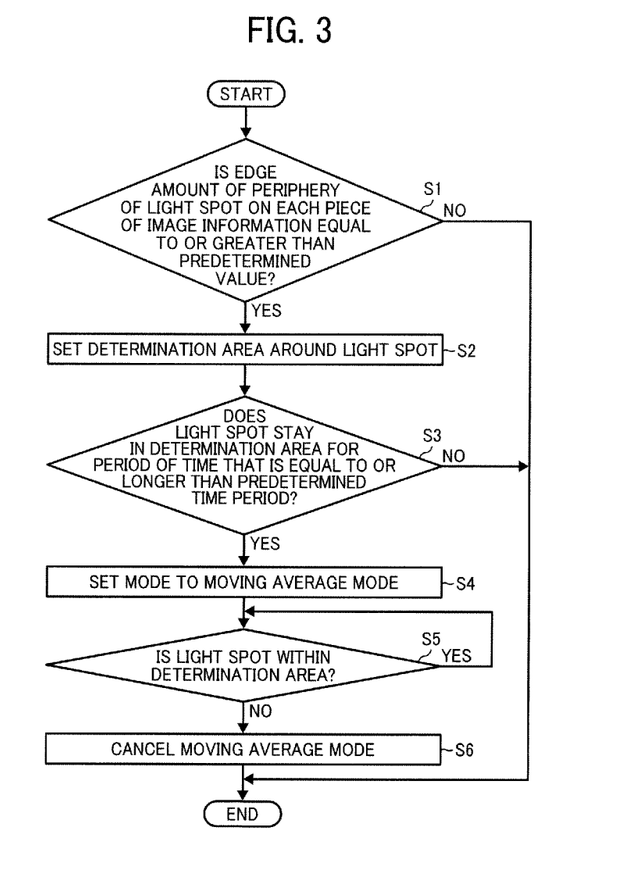
FIG. 3 is a flowchart illustrating a position information acquisition process according to an example embodiment of the present invention.
Figure 4:
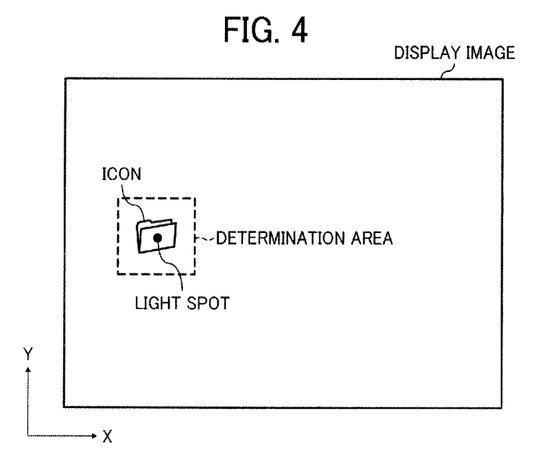
FIG. 4 illustrates an example determination area set on a display image.
Figure 5:
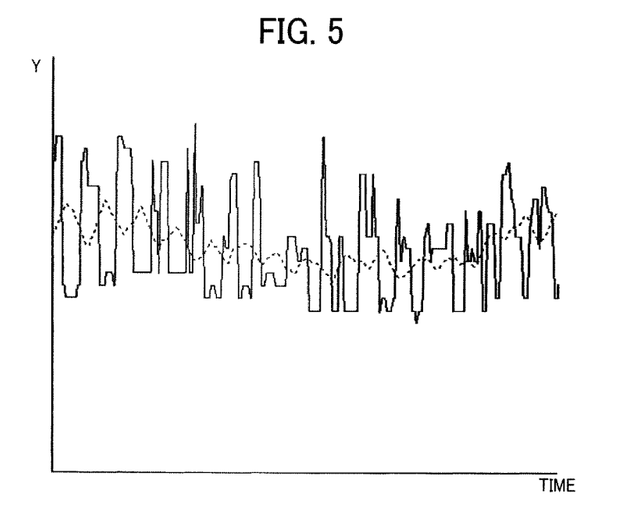
FIG. 5 is a graph illustrating the chronological position information of a light spot as well as the position information obtained by calculating the moving average of the position information, according to an example embodiment of the present invention.

FIG. 1 illustrates an image display system 100 according to an example embodiment of the present invention. FIG. 2 illustrates a position information obtaining device provided for an image display system, according to an example embodiment of the present invention. FIG. 3 is a flowchart illustrating a position information acquisition process according to an example embodiment of the present invention. FIG. 4 illustrates an example determination area set on a display image. FIG. 5 is a graph illustrating the chronological position information of a light spot as well as the position information obtained by calculating the moving average of the position information, according to an example embodiment of the present invention.

The image display system 100 is used for, for example, a presentation in a meeting.

The image display system 100 includes, for example, a projector 10 that serves as an image display unit, a position information obtaining device 12, and a PC 14 (personal computer) that serves as a processing device, as illustrated in FIG. 1.

The projector 10 projects (displays) an image on the surface of a screen S (hereinafter, this may be referred to as a screen surface) by, for example, projecting the modulated light on the screen surface according to the image information from the PC 14.

As will be described later in detail, the position information obtaining device 12 may obtain the position information of a position specified by using a laser pointer LP (light pointer) on the image that is displayed on the screen surface (hereinafter, this may be referred to as a display image). A semiconductor laser is used as the light source of the laser pointer LP in an example embodiment of the present invention, but a different kind of laser may also be used.

The position information obtaining device 12 may be integrated into the projector 10, and the position information obtaining device 12 may include a camera 16 that serves as an imaging unit and a position information obtaining unit 18. It is to be noted that although the position information obtaining device 12 is external to the projector 10 in the example embodiment, at least one of the camera 16 and the position information obtaining unit 18 may be built into the projector 10.

The camera 16 captures display images to which the laser pointer LP is directed and on which a light spot is formed, in chronological order, and transmits to an image information obtaining unit 18a, which will be described later, two or more pieces of image information obtained by capturing the display image in chronological order.

The position information obtaining unit 18 includes, for example, as shown in FIG. 2, the image information obtaining unit 18a, a light spot position detection unit 18b, an image analyzer 18c, a controller 18d, and an operation signal generator 18e.

The image information obtaining unit 18a obtains the two or more pieces of image information transmitted from the camera 16, and sends the two or more pieces of image information to the light spot position detection unit 18b and the image analyzer 18c.

The light spot position detection unit 18b detects the chronological position information (coordinates) of a light spot according to the two or more pieces of image information sent from the image information obtaining unit 18a, and sends the detected position information to the image analyzer 18c and the controller 18d. The light spot position detection unit 18b detects the chronological position information of a light spot by subjecting the two or more pieces of image information to, for example, noise filtering, digitalization, and barycenter detection processes.

The image analyzer 18c analyzes the two or more pieces of image information sent from the image information obtaining unit 18a by, for example, extracting an edge amount. Then, the image analyzer 18c sends a characteristic amount such as an edge amount of the periphery of a light spot of a display image to the controller 18d according to the position information of the light spot sent from the light spot position detection unit 18b.

The controller 18d generally controls a position information acquisition process, which will be described later. Moreover, the controller 18d converts position information (coordinate data) of the specified position of the display image on the coordinate system, which has been obtained by the camera 16 in the position information acquisition process, into coordinates on an image in the PC 14, and sends the coordinates to the operation signal generator 18e.

The operation signal generator 18e generates an operation signal that is identifiable by the PC 14, such as an operation signal equivalent to that of a USB mouse, and transmits the generated operation signal to the PC 14.

In this example, any of the above-described devices or units of the position information obtaining unit 18 can be implemented as a hardware apparatus, such as a special-purpose circuit or device, or as a hardware/software combination, such as a processor executing a software program.

Figure 9:
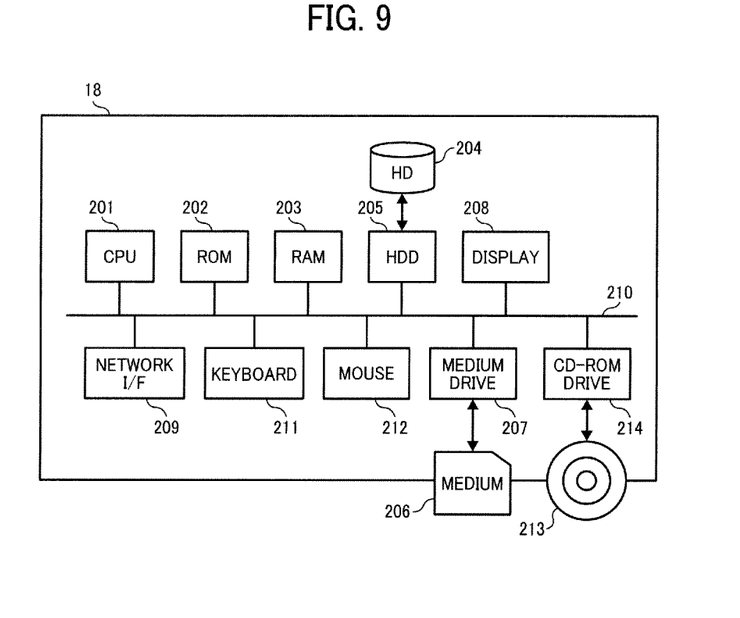
FIG. 9 is a hardware block diagram illustrating a structure of a position information obtaining device according to an example embodiment of the present invention.

For example, FIG. 9 is a hardware block diagram illustrating a structure of a position information obtaining unit 18. The position information obtaining unit 18 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus. The CPU 201 controls entire operation of the position information obtaining unit 18. The ROM 202 stores a control program for execution by the CPU 201, such as the IPL. The RAM 203 functions as a work area of the CPU 201. The HD 204 stores therein various data such as a position information obtaining program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The position information obtaining program may be written onto a recording medium that is readable by a general-purpose computer such as the recording medium 206 or the CD-ROM 213 in any format that is installable or executable by the general-purpose computer. Once the position information obtaining program is written onto the recording medium, the recording medium may be distributed. Further, the position information obtaining program may be stored in any desired memory other than the HD 204, such as the ROM 202. Alternatively, the position information obtaining unit 18 may be integrated into an image capturing device that includes the camera 16 to cause the image capturing device to function as the position information obtaining device 12.

The PC 14 receives the operation signal sent from the operation signal generator 18e, and performs an operation (process) that corresponds to the operation signal. The PC 14 has a hardware structure that is substantially similar to the one described above referring to FIG. 9.

An example of the operation of an image display system, which is used in a presentation in a meeting, will be described. The projector 10 and the position information obtaining device 12 are arranged so as to face the screen S.

Firstly, an image (still image) for a specified presentation is projected (displayed) on the screen surface by the projector 10. In an example embodiment of the present invention, the image information of an image for the above presentation is transmitted from the PC 14 to the projector 10, and the light modulated according to the transmitted image information is projected from the projector 10 onto the screen surface.

A person who makes a presentation (hereinafter, such a person will be referred to as a user) makes a presentation to other meeting participants while specifying a desired position on the display image by using a laser pointer LP.

When the laser pointer LP held by the user is directed to the display image, a light spot is formed on the display image by the laser light emitted from the laser pointer. This light spot moves on the display image according to the movement of the hand of the user that holds the laser pointer LP.

Accordingly, images of the display image on which a light spot is formed (hereinafter, this may be referred to as images to be captured) are captured by the camera 16 in chronological order.

Then, the chronological position information of a light spot is detected according to the two or more pieces of image information that are obtained by capturing images in chronological order. In particular, the light spot position detection unit 18*b* performs image processing such as a barycenter detection process on each piece of image information and detects the barycenter position of the detected light spot as the position information of the light spot in the image information, and the detected position information is transmitted to the image analyzer 18*c* and the controller 18*d*.

Then, the image analyzer 18*c* extracts an edge amount of the periphery of a light spot (a characteristic amount) from each piece of the image information.

A position information acquisition process in which the position information of a position specified by using a laser pointer LP is acquired as necessary will be described with reference to FIG. 3. The position information acquisition process is performed by the position information obtaining unit 18. The flowchart of FIG. 3 is based on a processing algorithm used by the controller 18*d*.

A user uses a laser pointer LP to specify an area that includes a desired position (coordinates) on a display image, i.e., an area on which an icon or a letter is drawn, for the purpose of performing various kinds of operations (processes) on the display image. Generally, icons or letters are drawn with a color that is different from that of the background so as to be distinguishable from the background, and when an edge image of icons or letters is extracted, a greater edge amount tends to be detected than that of the background. For this reason, when an edge amount of the periphery of a light spot of the display image is equal to or greater than a predetermined value, it is considered that such a light spot is close to an icon or letter.

Accordingly, in step S1, whether or not an edge amount (characteristic amount) of the periphery of a light spot extracted by the image analyzer 18*c* on each piece of the image information is equal to or greater than a predetermined value is determined. When the determination in step S1 is negative, the process terminates. More specifically, when the edge amount is less than a predetermined value, for example, when the light spot is at a point in the background, the determination in step S1 becomes negative. Note that although it is assumed that the characteristic amount of the periphery of a light spot is an edge amount in an example embodiment of the present invention, alternatively the characteristic amount of the periphery of a light spot may be, for example, the color, shape, or the like of the periphery of a light spot.

On the other hand, if the determination in step S1 is positive, the process shifts to step S2. More specifically, when the light spot is at a position where the edge amount of, for example, an icon, letter, or the like on a display image is equal to or greater than a predetermined value, the determination in step S1 becomes positive.

When a user indicates a desired position (coordinates) on the display image by using a laser pointer LP, the moving velocity of the light spot decreases as the light spot gets close to the desired position, and the light spot stays in an area including the desired position for a period of time that is equal to or longer than a predetermined time period. For this reason, when an edge amount of the periphery of a light spot of the display image is equal to or greater than a predetermined value and the light spot stays in an area including the desired position for a period of time that is equal to or longer than a predetermined time period, it is considered that the user is trying to indicate a position near an icon or letter for the purpose of performing various kinds of operations on a display image.

Given this situation, a determination area around the light spot (see FIG. 4) is set in step S2. The determination area is indicated by broken lines in FIG. 4, in this case, for example, a rectangular area surrounding an icon. Note that such a determination area is not necessarily rectangular, and is not necessarily displayed on a display image.

In step S3, whether or not a light spot stays in a determination area for a period of time that is equal to or longer than a predetermined time period is determined. When the determination in step S3 is negative, the process terminates. In particular, when the user is swinging the laser pointer directed to a display image, the determination in step S3 becomes negative. Note that the time is measured in step S3 by using, for example, a timer incorporated in the controller 18*d*.

On the other hand, when the determination in step S3 is positive, the process shifts to step S4. In particular, the laser pointer directed to a display image generally stops moving, the determination in step S3 becomes positive. In such cases, it is considered that the user is indicating a desired position on the display image.

When the position information of a specified position is obtained, it is difficult to precisely keep the light spot pointed by a laser pointer LP at a desired position (coordinates) on a display screen due to an effect of hand shake. For this reason, it is desired that the effect of hand shake be reduced. As the light spot moves at almost fixed intervals due to the effect of hand shake, it is effective to perform smoothing with a moving average that is equal to or greater than the above intervals.

Accordingly, the mode is set to a moving average mode in step S4. In other words, the chronological position information in a determination area of the light spot is detected from two or more pieces of image information that are obtained by capturing images to be captured in chronological order when the light spot is within the determination area, and it is estimated that the position information obtained by calculating the moving average of the detected position information is the position information of a specified position. Note that a moving average may be any moving average including a simple moving average and a weighted moving average.

FIG. 5 illustrates an example in which the chronological position information of a light spot is stabilized by using a moving average (for example, a simple moving average). In FIG. 5, the horizontal axis indicates time and the vertical axis indicates the Y-coordinate of an image to be captured.

It is clear from FIG. 5 that the chronological Y-coordinates of the light spot (i.e., position information in the Y-axis direction) are indicated by a solid line and that the Y-coordinates widely fluctuate. On the other hand, in FIG. 5 the Y-coordinates obtained by calculating moving averages of the chronological Y-coordinates of the light spot, at intervals greater than the intervals of hand shake, are indicated by a broken line. It is clear that the effect of hand shake is greatly reduced by calculating a moving average at intervals greater than the intervals of hand shake.

Note that the foregoing description of the position information of the light spot in the Y-axis direction holds true also for the position information of the light spot in the X-axis direction. Thus, the description of the position information of the light spot in the X-axis direction will be omitted.

In step S5, whether or not the light spot is within a determination area is determined. When the determination in step S5 is positive, the same determination is repeated. On the other hand, when the determination in step S5 is negative, the process shifts to step S6. More specifically, when the light spot is outside the determination area, the determination in step S5 becomes negative.

In step S6, the moving average mode is released, and the process terminates. In other words, the position information of the position on a display image to which the laser pointer LP is directed (specified position) is no longer estimated or obtained. As seen from the above description, when the laser pointer is directed by a user to a desired position of the display image such as an icon, the position information obtained by calculating the moving average of the chronological position information of a light spot is used as the position information of the light spot. Thus, even if the position of the light spot changes and slightly deviates from the icon due to, for example, hand shake, it is possible to obtain a good estimate of the position of the icon as the position information of a desired position. In other words, it becomes possible to obtain the position information of a desired position in a stable and precise manner.

As described above, when a user uses a laser pointer LP to indicate an icon or letter on the display image for the purpose of performing various kinds of operations on the display image, the position information obtained by calculating the moving average of the chronological position information of the light spot is used as an estimate of the position information of a specified position. Accordingly, the effect of hand shake is reduced and fine adjustment of a specified position may be performed, and the operability of the laser pointer LP may thereby be improved.

On the other hand, when a user moves the direction of a laser pointer away from an icon that is a desired position on the display image and the light spot deviates from a determination area, a desired position is not specified, and thus it is not necessary to obtain the position information of a specified position. Accordingly, the position information of a specified position is not estimated and not obtained.

When the position information acquisition process is completed as above, an operation signal that corresponds to the position information of the obtained specific position (for example, an icon), the existence of the detection of a light spot, or the like is transmitted to the PC 14 by the operation signal generator 18e, and it becomes possible to perform various kinds of operations such as moving a cursor, left-clicking, and right-clicking on a display image by using a laser pointer LP.

The position information obtaining device 12 according to an example embodiment of the present embodiment as described above is capable of obtaining the position information of a specified position on the image displayed on the screen surface (display image), where the specified position is specified by using a laser pointer LP. The position information obtaining device 12 includes the camera 16 that captures display images to which a laser pointer LP is directed and on which a light spot is formed, in chronological order, and the position information obtaining unit 18 capable of estimating the position information of a desired position according to two or more pieces of image information obtained by chronologically capturing display images on which a light spot is formed and obtaining the estimated position information.

In such cases, the position information of a specified position is estimated and obtained when a desired position on the display image (for example, an icon) is indicated by using a laser pointer LP. On the other hand, when a laser pointer LP is unintentionally directed to, for example, the background of the display image, i.e., when a desired position on the display image is not indicated by using a laser pointer LP, the position information of a specified position is not estimated and not obtained.

As a result, the position information obtaining device 12 may obtain the position information of a desired position specified by a laser pointer in a stable and precise manner.

When obtaining the position information of a desired position specified on a display image by using a laser pointer LP, the position information obtaining unit 18 detects the chronological position information of a light spot from two or more pieces of image information, and estimates the position information obtained by calculating the moving average of the detected two or more pieces of position information to be the position information of a specified position.

In such cases, even when the position of the light spot changes due to, for example, hand shake, it is possible to obtain the position information of the desired position quickly and accurately. Moreover, it is possible to perform fine adjustment on a position specified by using a laser pointer LP, and the operability of the laser pointer LP may thereby be improved. As a result, even when a light spot is moved between two neighboring icons, it becomes possible to obtain the position information of a desired position (i.e., desired icon) quickly and accurately.

On the other hand, JP-3419978-B1 (JP-H09-154089) discloses a technique in which the position change of a light spot is cancelled when the amount of the movement of the light spot is equal to or less than a specified value, such that the effect of the position change (coordinate change) of the light spot due to hand shake while a desired position is being specified by using a light pointer will be reduced. However, in the disclosure of JP-3419978 (JP-H09-154089), coordinate change are cancelled even when fine adjustment is to be performed on a specified position. Accordingly, the light spot is once moved away from the desired position and is moved to the desired position again, which is troublesome.

Further, the position information obtaining unit 18 obtains the position information of a specified position when a light spot stays within a determination area of a display image for a period of time that is equal to or longer than a predetermined time period.

In such cases, the position information of a specified position may be obtained when it is highly likely that a desired position is being specified by using a laser pointer LP. Conversely, the position information of an unnecessary specified position may be prevented from being obtained.

The position information obtaining unit 18 calculates a moving average at intervals longer than the intervals of the oscillation of a light spot caused due to hand shake.

In such cases, it is possible to obtain the position information of a specified position accurately by reducing the effect of the position change of a light spot due to hand shake as much as possible.

Further, the position information obtaining unit 18 analyzes an edge amount of the periphery of the position of the light spot in two or more pieces of image information, and when such an edge amount is equal to or greater than a predetermined value, the position information obtaining unit 18 obtains the position information of a specified position.

In such cases, a difference in edge amount is great between an icon, a letter, or the like and the background, and thus the position information of an icon, a letter, or the like that serves as a desired position may be reliably obtained.

In an example embodiment of the present invention described above, one determination area is set. However, two or more determination areas may be set.

Figure 6:
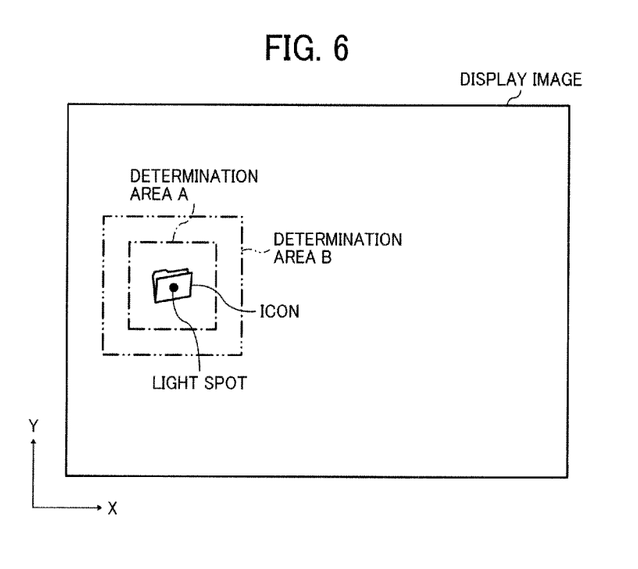
FIG. 6 illustrates two example determination areas set for a display image according to a first variation.

For example, FIG. 6 illustrates two example determination areas set for a display image according to a first variation. As illustrated in the first variation of FIG. 6, a square determination area A, and a square-frame determination area B that surrounds the determination area A may be set.

Figure 7:
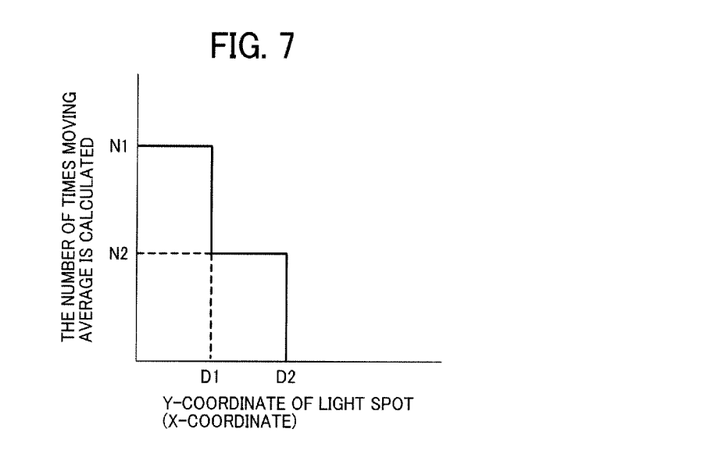
FIG. 7 is a graph illustrating the relationship between the position information of the light spot and the number of times the moving average of the position information is calculated, according to the first variation.

FIG. 7 is a graph illustrating the relationship between the position information of the light spot and the number of times the moving average of the position information is calculated, according to the first variation. In the first variation, the number of times a moving average is calculated is differentiated between when a light spot is within the determination area A and when the light spot is within the determination area B. In particular, it is assumed that the number of times a moving average is calculated when a light spot is within the determination area A is N1, and that the number of times a moving average is calculated when the light spot is within the determination area B is N2(<N1). In other words, the number of times a moving average is calculated is variable depending on the distance from a desired position on the display image (for example, an icon).

More specifically, the number of times a moving average is calculated "N1" in the determination area A where the distance from a desired position on the display image is short is greater than the number of times a moving average is calculated "N2" in the determination area B where the distance from a desired position on the display image is long. It is considered that the length of time during which the light spot stays in the determination area A is greater than the length of time during which the light spot stays in the determination area B. It is assumed that the distance between the outer edge of the determination area A and the center is D1, and that the distance between the outer edge of the determination area B and the center is D2.

According to the first variation, when, for example, a light spot is on an icon or close to the icon, the number of times a moving average is calculated is increased and fine adjustment of a specified position may be achieved. Conversely, when a light spot is away from an icon, the number of times a moving average is calculated is reduced, and a response speed may be improved. Accordingly, the operability of the laser pointer LP may be further improved.

In the first variation described above, it is assumed that the determination areas A and B are square, but the shape of these areas may be different. In addition to the determination areas A and B, at least one frame-like determination area that surrounds the determination area B may be set.

In an example embodiment described above, cases in which an image displayed on the screen surface (i.e., display image) is a still image have been described. However, the display image may be a video or a moving image In an example embodiment described above, a characteristic amount such as an edge amount of the periphery of a light spot on a display image is extracted, and a specified position is obtained by using the moving average mode. Accordingly, when an edge amount of the periphery of a light spot increases while, for example, a video is being played, there is a risk that the mode is set to the moving average mode even though an icon or a letter is not indicated by a laser pointer LP.

Figure 8:
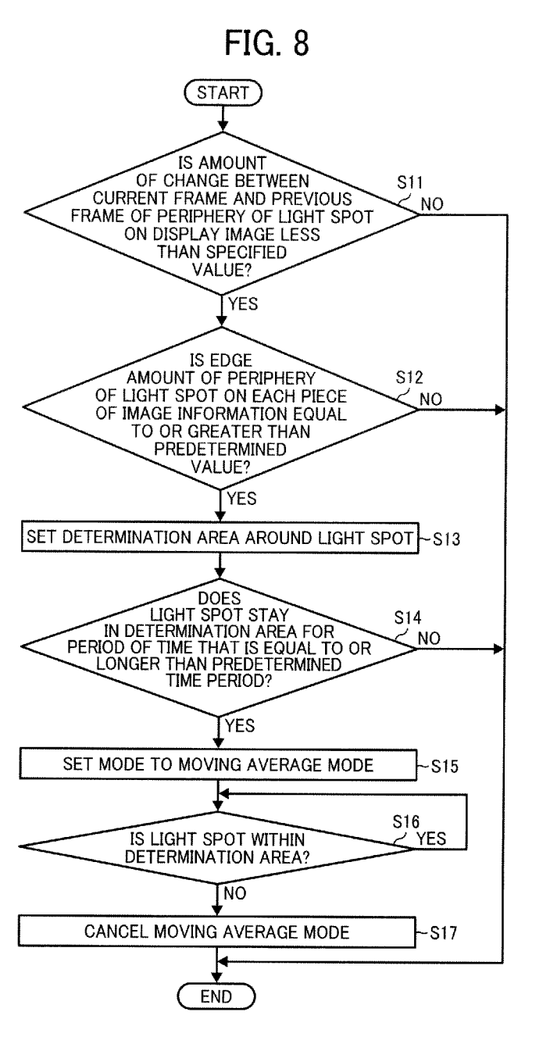
FIG. 8 is a flowchart of the position information acquisition process according to a second variation.

FIG. 8 is a flowchart of the position information acquisition process according to a second variation. In the second variation, a moving image that serves as display images is captured in chronological order, and a difference (i.e., the amount of change) between the image of the obtained current frame and the image of the previous frame is extracted and obtained. Then, as illustrated in FIG. 8, whether or not the amount of change is less than a specified value is determined in the first step S11. When the determination in step S11 is negative, the process terminates. In other words, when the obtained amount of change is equal to or greater than a specified value, the images are determined to be a part of a video, and the mode is not set to the moving average mode.

On the other hand, when the determination in step S11 is positive, the process shifts to step S12. In other words, when the amount of change described above is less than a specified value, a characteristic amount of the images is determined (step S12), and a determination area is set (step S13) and the position of the light spot is judged (step S14). When an icon or a letter is indicated by a laser pointer LP after these steps, the mode is set to the moving average mode (step S15). Note that steps S12 to S17 in the flowchart of FIG. 8 are similar to steps S1 to S6 in the flowchart of FIG. 3 that have been described above as an example embodiment of the invention, and thus a redundant description thereof is omitted here.

According to the second variation, when such a part of a video is indicated by a laser pointer LP while the video is being played, a specified position is not obtained. Accordingly, it becomes possible to minimize malfunctions and the operability of the laser pointer LP may be further improved.

In the second variation, it is not always required that step S11 of FIG. 8 be performed. In the second variation, it is not always required that step S12 of FIG. 8 be performed. Further, in the second variation, it is not always required that steps S13, S14, and S16 of FIG. 8 be performed.

In an example embodiment of the invention as described above, it is not always required that step S1 of FIG. 3 be performed. Moreover, in an example embodiment of the invention as described above, it is not always required that steps S2, S3, and S5 of FIG. 3 be performed.

In an example embodiment of the invention and the variations described above, a screen surface is used as an image display surface. However, the image display surface is not limited to a screen surface, but may be a surface of, for example, a liquid crystal monitor, a liquid crystal television, and a plasma display panel television.

In an example embodiment of the invention and the variations described above, a laser pointer is used as a light pointer. However, the light pointer is not limited to a laser pointer, but may be a light pointer including a LED (light emitting diode).

In an example embodiment of the invention and variations described above, the projector 10 and the position information obtaining device 12 are integrated into a single unit, but the projector 10 and the position information obtaining device 12 may be configured in an independent manner. In such cases, the camera 16 and the position information obtaining unit 18 of the position information obtaining device 12 may be configured in an independent manner.

Moreover, in an example embodiment of the invention and variations described above, the PC 14 is used as a processing device. However, the processing device is not limited to the PC 14, and other devices such as tablet devices may also be used.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general-purpose microprocessors and/or signal processors programmed accordingly.

What is claimed is:

1. A position information obtaining device comprising:
   imaging means for capturing images to which a light pointer is directed and on which a light spot is formed, in chronological order over a period of time; and
   position information obtaining means for estimating position information of a specified position on the images specified by the light pointer using a plurality of pieces of image information obtained from the captured images,
   wherein when the light spot stays in a predetermined region on the image for a period of time that is equal to or longer than a predetermined time period, the position information obtaining means sets a determination area around the light spot, detects chronological position information of the light spot, including detecting and capturing a plurality of pieces of chronological position information of the light spot over the period of time, when the light spot stays within the determination area, and utilizes the chronological position information to determine the estimated position information, including calculating a moving average of the plurality of pieces of chronological position information of the light spot to calculate the estimated position information of the specified position.

2. The position information obtaining device according to claim 1, wherein the position information obtaining means changes a number of times the moving average is calculated depending on an area at which the light spot within the predetermined region is positioned.

3. The position information obtaining device according to claim 2, wherein the position information obtaining means increases the number of times the moving average is calculated when the light spot is within the predetermined region.

4. The position information obtaining device according to claim 1, wherein the position information obtaining means calculates the moving average at intervals longer than intervals of oscillation of the light spot caused due to hand shake.

5. The position information obtaining device according to claim 1, wherein the position information obtaining means analyzes a characteristic amount of a periphery of a position of the light spot in the plurality of pieces of image information, and when the characteristic amount is equal to or greater than a predetermined value, the position information obtaining means obtains the position information of the specified position.

6. The position information obtaining device according to claim 5, wherein the characteristic amount is an edge amount of the periphery of a position of the light spot in the plurality of pieces of image information.

7. The position information obtaining device according to claim 1, wherein the images are frames of a moving image and the position information obtaining means obtains the position information of the specified position when an amount of change between a current frame and a previous frame of the moving image at a position of the light spot is within a fixed range.

8. An image display system comprising:
   the position information obtaining device according to claim 1;
   image displaying means for displaying an image on the image display surface; and
   a processing device configured to perform a process that corresponds to the position information, using the position information of the specified position obtained by the position information obtaining device.

9. A position information obtaining device comprising:
   a processor configured to:
      obtain images captured by an imaging device in chronological order over a period of time, the imaging device capturing the images to which a light pointer is directed and on which a light sport is formed;
      estimate position information of a specified position on the images specified by the light pointer using a plurality of pieces of image information obtained from the captured images; and
      when the light spot stays in a predetermined region for a period of time that is equal to or longer than a predetermined time period, set a determination area around the light spot, detect chronological position information of the light spot, including detecting and capturing a plurality of pieces of chronological position information of the light spot over the period of time, when the limit spot stays within the determination area, and utilize the chronological position information to determine the estimated position information, including calculating a moving average of the plurality of pieces of chronological position information of the light spot to calculate the estimated position information of the specified position.

10. The position information obtaining device according to claim 9, wherein the processor is configured to change a number of times the moving average is calculated depending on an area at which the light spot within the predetermined region is positioned.

11. The position information obtaining device according to claim 10, wherein the processor is configured to increase the number of times the moving average is calculated when the light spot is within the predetermined region.

12. The position information obtaining device according to claim 9 wherein the processor is configured to calculate the moving average at intervals longer than intervals of oscillation of the light spot caused due to hand shake.

13. The position information obtaining device according to claim 9, wherein the processor is configured to analyze a characteristic amount of a periphery of a position of the light spot in the plurality of pieces of image information, and when the characteristic amount is equal to or greater than a predetermined value, the processor is configured to obtain the position information of the specified position.

14. The position information obtaining device according to claim 13, wherein the characteristic amount is an edge amount of the periphery of a position of the light spot in the plurality of pieces of image information.

15. The position information obtaining device according to claim 9, wherein the images are frames of a moving image and the processor is configured to obtain the position information of the specified position when an amount of change between a current frame and a previous frame of the moving image at a position of the light spot is within a fixed range.

16. A method of obtaining position information of a specified position on an image, the method comprising:
   capturing images to which a light pointer is directed and on which a light spot is formed, in chronological order over a period of time; and
   estimating the position information of the specified position on an image specified by the light pointer using a plurality of pieces of image information obtained from the captured image; and
   creating a determination area around to surround the light spot, detecting chronological position information of the light spot in the determination area, including detecting and capturing a plurality of pieces of chronological position information of the light spot over the period of time, and utilizing the chronological position information to determine the estimated position information, including calculating a moving average of the plurality of pieces of chronological position information of the light spot to calculate the estimated position information of the specified position.

* * * * *